Sept. 30, 1958 H. H. LEWIS 2,854,523

TELEPHONE HANDSET SUPPORT

Filed March 7, 1957

INVENTOR.
HARRIET LEWIS

BY Ostrolenk, Faber, Gerb & Soffen
ATTORNEYS

United States Patent Office 2,854,523 Patented Sept. 30, 1958

2,854,523

TELEPHONE HANDSET SUPPORT

Harriet H. Lewis, Jamaica, N. Y.

Application March 7, 1957, Serial No. 644,533

5 Claims. (Cl. 179—156)

This invention relates to a device for supporting a telephone handset in operating position on the head of the user so as to leave his hands free for other purposes. The present device finds particular utility in the home or office when it becomes desirable or necessary that the user's hands be unoccupied.

The present device finds specific application to the type of telephone instrument now widely in use which generally comprises a base or support having a switching and dialing mechanism and a handset receivable in the said base. The handset is of the type having a transmitter near one end thereof and a receiver near the opposite end with an elongated integral handle for joining the transmitter and receiver. In utilizing a telephone handset of this type it is generally necessary to employ one hand for holding the telephone in operating position thereby leaving only one hand free for other purposes.

Many devices have been proposed which would allow the user to have both hands free when using a telephone of this type, but such devices generally have been too complex and uneconomical to gain widespread use. Indeed certain devices of the prior art require that the head be placed in an unusual and strained position in order to properly place the handset with respect to the user's mouth and ear.

Other prior art devices require rather cumbersome screw and clamp means, which by erroneous adjustment might crack the telephone receiver or which actually require attachment to the telephone which might damage the plastic casing thereof and would, therefore, require permission of the telephone company.

Accordingly it is one object of this invention to provide a telephone handset support which is simple and economical and practical in construction.

Another object of this invention is to provide a telephone handset support which is easily held in operative position without any strain on the user.

Still another object of this invention is to provide a telephone handset support which has no tendency to damage the handset casing or in any other way obstruct the functioning of the telephone.

These and other objects of the present invention will become more apparent when taken in connection with the following description and the drawings in which.

Figure 1:
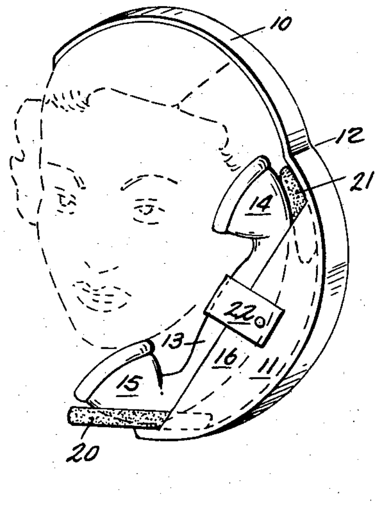
Figure 1 is a perspective view illustrating the present handset support when operatively secured to the handset and when in engagement with the head of the user.
Figure 2:
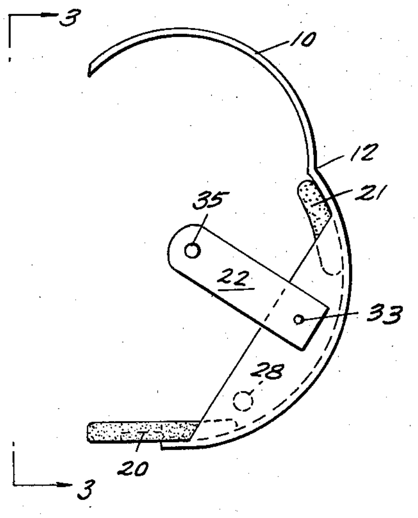
Figure 2 is a side view of the telephone support showing the construction thereof in more detail.
Figure 3:
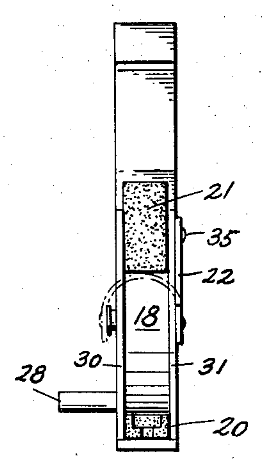
Figure 3 is a front elevation taken along the lines 3—3 of Figure 2 and looking in the direction of the arrows.

Essentially the present invention involves a device for supporting a telephone handset which is a completely integral unit. The device includes a head engaging member adapted to sit on the user's head and integral therewith a cradle member for supporting the telephone handset. The cradle member has a convex outer surface and contains therein a hollow recess which generally corresponds to the contour of the handset. The inner surface of the recess generally corresponds to the contour of the handset.

The handset is retained within said recess by a suitable flexible retaining means such as a strap rigidly secured to one side of the cradle and removably secured to the opposite side thereof. The strap is so positioned that it engages the handle portion of the handset intermediate the transmitter and the receiver and thereby readily secures the handset within the cradle. Also provided are spongy or other suitable cushioning means for resiliently engaging the telephone transmitter and receiver. In order to provide further support against the upper chest or shoulder of the user an integral projection may also be provided on the side of the cradle normally facing the user and near the transmitter supporting end thereof.

The entire assembly as described above may be cast as one integral unit from, if desired, a suitable, moldable, rigid plastic material. Moreover, the device cannot in the least damage the telephone handset and does not require the use of elaborate clamps or screws which upon being improperly adjusted could crack the handset casing.

Referring now to the drawings in more detail it is seen that the present device includes a head engaging member 10 and a cradle member generally designated as 11. These two members are integral although there may be a break in the outer curvature thereof at the point 12. The head engaging member, of course, may be made adjustable, if desired.

The cradle member 11 is adapted to support the telephone handset 13 which is of the conventional type having a receiver 14 at one end and a transmitter 15 at the opposite end. The transmitter and receiver are joined by integral handle member 16. The cradle portion of the present device has a hollow recess 18 which generally corresponds to the contour of the handset. The opposite ends of the recess are partially projecting therefrom and there are located a cushioning means 20 and 21 for supporting the transmitter and receiver, respectively.

The cradle is provided at an intermediate part thereof with a flexible means 22 such as a leather strap which engages the handset in the handle portion thereof and in a spaced-apart relationship from the transmitter and receiver. This provides support near the center of gravity and when combined with the support given by the inner surface of the cradle allows the telephone to be retained in the desired operative position without the necessity of extraneous screws and clamps or of having the user keep his head in a strained position.

If desired, additional support may be provided by the inclusion of an integral projection 28 which is on the side of the cradle 30 normally facing the user. The strap member 22 is conveniently secured to this side by a snap 35 or any other suitable means. The strap is rigidly secured to the opposite side of the cradle 21 by any suitable means such as screw 33 or, if desired, by means of an adhesive composition.

In the foregoing, this invention has been described only in connection with preferred embodiments thereof. Many variations and modifications of the principles of the invention within the scope of the description herein are obvious. Accordingly, it is preferred that the invention be bound not by the specific disclosure herein, but only by the appending claims.

I claim:

1. A device for supporting a telephone handset comprising a head engaging member adapted to fit on a user's head; a cradle member for supporting the telephone handset integral with said head engaging member; said cradle having a hollow recess therein generally corresponding to the contour of the handset, and a flexible strap secured to one side of said cradle and removably secured to the opposite side thereof for engaging the handle portion of said handset and retaining it within said cradle.

2. A device for supporting a telephone handset comprising a head engaging member adapted to fit on a user's head; a cradle member for supporting the telephone handset integral with said head engaging member; said cradle having a hollow recess therein generally corresponding to the contour of the handset, and flexible means secured to one side of said cradle and removably secured to the opposite side thereof for engaging the handle portion of said handset and retaining it within the said cradle and an integral projection on the side of the cardle normally facing the user for engaging the body of the user and thereby providing additional support for the cradle.

3. A device for supporting a telephone handset comprising a head engaging member adapted to fit on a user's head; a cradle member for supporting the telephone handset integral with said head engaging member; said cradle having a hollow recess therein generally corresponding to the contour of the handset, and flexible means secured to one side of said cradle and removably secured to the opposite side thereof for engaging the handle portion of said handset and retaining it within said cradle; said cradle further having adjacent the ends thereof cushioning means for supporting the mouth piece and ear piece of the said handset.

4. A device for supporting a telephone handset comprising a head engaging member adapted to fit on a user's head; a cradle member for supporting the telephone handset integral with said head engaging member; said cradle having a hollow recess therein generally corresponding to the contour of the handset, and flexible means secured to one side of said cradle and removably secured to the opposite side thereof for engaging the handle portion of said handset and retaining it within said cradle and an integral projection on the side of the cradle normally facing the user for engaging the body of the user and thereby providing additional support for the cradle; said cradle further having adjacent the ends thereof cushioning means for supporting the mouth piece and ear piece of the said handset.

5. A device for supporting a telephone handset comprising a head engaging member adapted to fit on a user's head; a cradle member for supporting the telephone handset integral with said head engaging member; said cradle having a hollow recess therein generally corresponding to the contour of the handset, and a flexible strap secured to one side of said cradle and removably secured to the opposite side thereof for engaging the handle portion of said handset and retaining it within said cradle and an integral projection on the side of the cradle normally facing the user for engaging the body of the user and thereby providing additional support for the cradle; said cradle further having adjacent the ends thereof flexible sponge means for supporting the mouth piece and ear piece of the said handset.

References Cited in the file of this patent

UNITED STATES PATENTS

D. 130,067 Epstein ---------------- Oct. 21, 1941

FOREIGN PATENTS 436,558 Italy ------------------ June 10, 1948